US008941150B2

(12) United States Patent
Sherlekar et al.

(10) Patent No.: US 8,941,150 B2
(45) Date of Patent: Jan. 27, 2015

(54) POWER ROUTING IN STANDARD CELLS

(71) Applicant: Synopsys, Inc., Mountain View, CA (US)

(72) Inventors: Deepak D. Sherlekar, Cupertino, CA (US); Vahe Hovsepyan, Yerevan (AM)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/259,119

(22) Filed: Apr. 22, 2014

(65) Prior Publication Data
US 2014/0229908 A1 Aug. 14, 2014

Related U.S. Application Data

(63) Continuation of application No. 13/040,228, filed on Mar. 3, 2011, now Pat. No. 8,742,464.

(51) Int. Cl.
*H01L 29/73* (2006.01)
*G06F 17/50* (2006.01)
*H01L 27/02* (2006.01)
*H01L 27/118* (2006.01)

(52) U.S. Cl.
CPC ........ *G06F 17/5072* (2013.01); *G06F 17/5077* (2013.01); *H01L 27/0207* (2013.01); *H01L 27/11807* (2013.01); *H01L 2027/11881* (2013.01); *G06F 2217/78* (2013.01)
USPC ......................................... 257/207; 257/203

(58) Field of Classification Search
USPC ...................... 257/202–211, E29.12, E29.246
See application file for complete search history.

(56) References Cited

U.S. PATENT DOCUMENTS

| | | | |
|---|---|---|---|
| 5,943,243 A | 8/1999 | Sherlekar et al. | |
| 6,091,090 A | 7/2000 | Gheewala | |
| 6,617,621 B1 | 9/2003 | Gheewala et al. | |
| 6,637,016 B1 | 10/2003 | Pavisic et al. | |
| 6,838,713 B1 | 1/2005 | Breid et al. | |
| 6,865,721 B1 | 3/2005 | Dahl et al. | |
| 7,039,881 B2 | 5/2006 | Regan | |
| 7,069,522 B1 | 6/2006 | Sluss et al. | |
| 7,129,562 B1 | 10/2006 | Gheewala et al. | |
| 7,217,963 B2 * | 5/2007 | Kanno et al. | 257/207 |
| 7,219,324 B1 | 5/2007 | Sherlekar et al. | |
| 7,304,355 B2 * | 12/2007 | Zhang | 257/390 |
| 7,475,379 B2 | 1/2009 | McCullen | |
| 7,603,634 B2 | 10/2009 | Sluss et al. | |
| 7,895,548 B2 | 2/2011 | Lin et al. | |

(Continued)

OTHER PUBLICATIONS

PCT International Search Report and Written Opinion, PCT Application No. PCT/US12/26177, Jun. 29, 2012, 12 pages.

(Continued)

*Primary Examiner* — Cuong Q Nguyen
(74) *Attorney, Agent, or Firm* — Fenwick & West LLP

(57) ABSTRACT

An integrated circuit created from a cell library of compact cells. The cell library includes cells having a metal trace routed along the boundary of the cells for carrying a power supply voltage. The cells also include another metal trace routed along the interior of the cells for carrying another power supply voltage. A cell pin carrying an input signal or output signal of the cell is located outside of the region between the two power rails. By routing the power supply voltages and cell pins of the cell in this manner, the integrated circuit created from the cell is extremely compact while still complying with various design rules.

20 Claims, 10 Drawing Sheets

(56) References Cited

U.S. PATENT DOCUMENTS

| | | |
|---|---|---|
| 7,989,849 B2 | 8/2011 | Sherlekar et al. |
| 8,742,464 B2 | 6/2014 | Sherlekar et al. |
| 2001/0034873 A1 | 10/2001 | Arsintescu |
| 2003/0084418 A1 | 5/2003 | Regan |
| 2005/0081176 A1 | 4/2005 | Ohshige |
| 2006/0048079 A1 | 3/2006 | Dirks et al. |
| 2006/0117283 A1 | 6/2006 | Katou et al. |
| 2006/0198228 A1 | 9/2006 | Sluss et al. |
| 2007/0157144 A1 | 7/2007 | Mai et al. |
| 2007/0180419 A1 | 8/2007 | Sherlekar et al. |
| 2008/0028352 A1 | 1/2008 | Birch et al. |
| 2008/0111158 A1 | 5/2008 | Sherlekar et al. |
| 2008/0237736 A1* | 10/2008 | Sakurai et al. ............ 257/379 |
| 2009/0108360 A1 | 4/2009 | Smayling et al. |
| 2009/0169832 A1 | 7/2009 | Aton |
| 2009/0235210 A1 | 9/2009 | Shih et al. |
| 2010/0097875 A1 | 4/2010 | Vinke et al. |
| 2010/0155783 A1 | 6/2010 | Law et al. |
| 2010/0181600 A1 | 7/2010 | Law et al. |
| 2011/0078639 A1 | 3/2011 | Lin et al. |
| 2012/0110539 A1 | 5/2012 | Birch et al. |
| 2012/0241986 A1 | 9/2012 | Sherlekar et al. |

OTHER PUBLICATIONS

PCT International Search Report and Written Opinion, PCT Application No. PCT/US12/30777, Jun. 22, 2012, 13 pages.

* cited by examiner

POWER ROUTING IN STANDARD CELLS

CROSS REFERENCE TO RELATED APPLICATION(S)

This application is a continuation of U.S. patent application Ser. No. 13/040,228, titled "Power Routing in Standard Cells" filed on Mar. 3, 2011, the contents of which are incorporated by reference in their entirety.

BACKGROUND

1. Field of Art

The disclosure generally relates to the field of electronic design automation (EDA), and more specifically to routing of power supply voltages for a standard cell that is used to design integrated circuits (ICs).

2. Description of the Related Art

Computer-aided cell-based design has been developed for quickly designing large scale ICs such as application specific integrated circuits (ASICs) and gate arrays. The cell is a circuit that has been pre-designed and pre-verified as a building block. Design technologies known as standard cell and gate array use different types of such building blocks. In a standard cell design, each distinct cell in a library may have unique geometries of active, gate, and metal levels. With gate arrays, however, each gate array cell shares the same building block, called a core cell that includes fixed active and gate level geometries. Different gate array cells are implemented using only metal interconnections between the active and gate elements of one or more core cells. Examples of a standard cell or gate array cell include an inverter, a NAND gate, a NOR gate, a flip flop, and other similar logic circuits.

During the process of designing an integrated circuit, a designer may select particular cells from a library of cells and use them in a design. The library includes cells that have been designed for a given integrated circuit (IC) manufacturing process, such as complementary metal oxide semiconductor (CMOS) fabrication. The cells generally have a fixed height but a variable width, which enables the cells to be placed in rows. Cells do not change from one design to the next, but the way in which they are interconnected will, to achieve the desired function in a given design. By being able to select the cells from the library for use in the design, the designer can quickly implement a desired functionality without having to custom design the entire integrated circuit from scratch. The designer will thus have a certain level of confidence that the integrated circuit will work as intended when manufactured without having to worry about the details of the individual transistors that make up each cell.

Because a designer will use many copies (called instances) of a cell in a particular design, it is important to optimize the cells to be as compact as possible. Otherwise, any inefficiency will be replicated with every instance of the standard cell in the design. Advantages of smaller cells include being able to fit complex circuits within a limited amount of space. Having smaller cells also reduces the physical size of an integrated circuit, thereby reducing the cost of manufacturing the integrated circuit.

It also important for cells to be designed so that routing connections can be made efficiently. Routing in an IC design is accomplished through routing elements, such as traces in one or more metal layers. Each metal layer is separated from other metal layers by insulating layers, and vias connect one metal layer to another. These routing elements perform at least two functions: they connect individual transistors that make up a cell, and they connect cells to each other globally (i.e., on a chip-level) to implement the desired functionality of the integrated circuit. For example, clock signals, reset signals, test signals, and supply voltages may be carried through these routing elements. A properly designed cell minimizes congestion in routing global interconnections, which reduces the number of metal layers that need to be used in manufacturing the integrated circuit.

Another concern is complying with various design rules. Restrictive design rules are new design rules governing layouts of objects (such as metal, polysilicon, and vias) which are more restrictive in nature than those imposed in older semiconductor processes. Some restrictive design rules account for inevitable variations during the manufacturing of an integrated circuit and are needed by the foundry to manufacture a chip. Examples of restrictive design rules include requiring all gates in the layout to have the same pitch (i.e., be spaced at equal distances) or requiring all gates in the layout to be in the same direction. An example of a normal rule is a rule that that metal wires must have a minimum spacing to other metal wires within the same layer. Other design rules reflect best practices that enable efficient chip routing, but are not absolute rules needed by the foundry to manufacture a chip. For example, it is preferred that traces within some metal layers all run in the same direction to reduce chip level routing congestion.

SUMMARY

Embodiments of the present disclosure relate to an integrated circuit, a computer-readable medium storing instructions for creating a layout for an integrated circuit, and a method for fabricating an integrated circuit. At least one cell in integrated circuit architecture includes a first metal wire extending along a first boundary of the cell for carrying a first power supply voltage. A second metal wire extends along an interior of the cell for carrying a second power supply voltage. A cell pin corresponding to an input signal or output signal of the cell is located between the second metal wire and a second boundary that is opposite from the first boundary. By configuring the power supply voltages and cell pins in this manner, the layout for the integrated circuit is more compact while still complying with various design rules.

One embodiment of the non-transitory computer readable medium stores instructions for receiving a plurality of cells and generating a layout for an integrated circuit from cells. At least one of the cells includes a first metal wire extending along a first boundary of the cell for carrying a first power supply voltage. A second metal wire extends along an interior of the cell for carrying a second power supply voltage. A cell pin corresponding to one of an input signal or output signal of the cell is located between the second metal wire and a second boundary that is opposite from the first boundary.

One embodiment of the method for fabricating an integrated circuit comprises forming a cell pin corresponding to one of an input signal or output signal of a cell. A first metal wire is formed along a first boundary of the cell for carrying a first power supply voltage. A second metal wire is formed along an interior of the cell for carrying a second power supply voltage. The cell pin and wires are formed such that the cell pin is located between the second metal wire and a second boundary of the cell that is opposite from the first boundary.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG.) 1 illustrates one embodiment of components of an example machine able to read instructions from a machine-readable medium and execute them in a processor (or controller).

DETAILED DESCRIPTION

Figure 1:
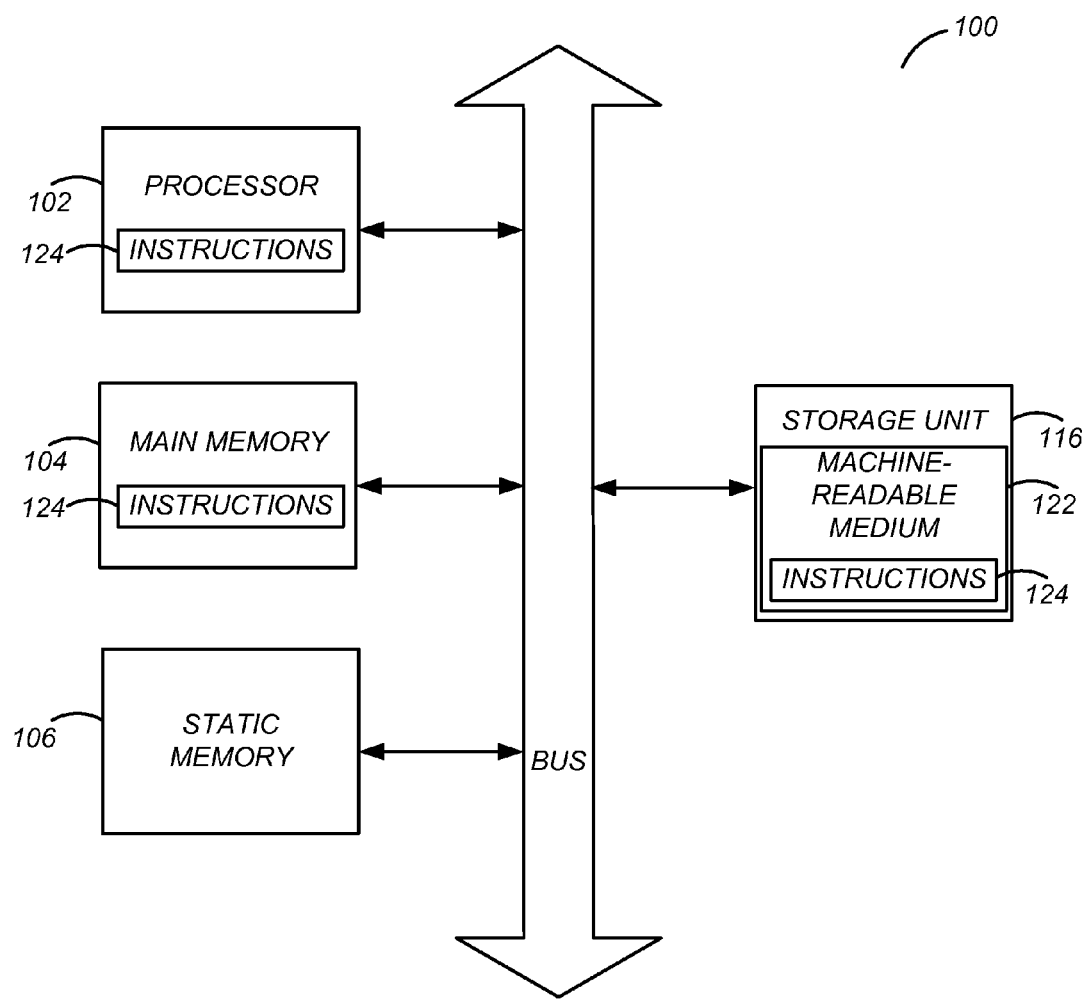

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments of the present disclosure relate to a cell library of compact predefined cells for use in designing and manufacturing an integrated circuit. In one embodiment, the cell library includes a plurality of predefined cells with one power supply voltage routed along the boundary of the cells and another power supply voltage routed along the interior of the cells. A cell pin carrying an input or output signal of the predefined cell, or an internal connection between transistors of the predefined cell, is positioned outside of the region between the two power rails. By routing the power supply voltages and signals of the predefined cell in this manner, the predefined cells, as well as the integrated circuit created from the predefined cells, are more compact while still complying with design rules.

A cell described herein refers to predefined circuit unit or circuit element that is provided, as part of a cell library of many different types of circuit units, to an integrated circuit designer; the cell is re-used in multiple instances as needed to make up the integrated circuit. For example, a cell may be an inverter, a NAND gate, a NOR gate, a flip flop, and other similar logic circuits. Each cell has a boundary, typically consisting of four edges that form a rectangular shape. As used herein, a standard cell refers to a cell with a predefined layout that is used in conjunction with other standard cells to implement a desired functionality of an integrated circuit. Standard cells may have fixed active and gate level geometries. Standard cells have a fixed height but variable width, which allows the standard cells to be placed side by side in rows. Embodiments of this disclosure will be described with reference to standard cells, but the principles described herein are applicable to both standard cells and other cells such as gate array cells.

A cell pin described herein refers to metal wires within a cell that serve as connection points for external connections to a cell (e.g., connections between one cell and another cell). Cell pins are sometimes referred to as cell ports, although the term cell pin is meant to include both cell pins and cell ports. There are several types of cell pins: input pins, output pins, and power pins. Input pins are the connection points for the input signals of a standard cell. Output pins are connection points for the output signals of a standard cell. Input pins and output pins are collectively referred to herein as "signal pins." Power pins are the connection points for power supply voltages, for example, VDD and VSS voltages. The locations of the pins are designated by the designer of the standard cell when creating the cell.

A gate, as described herein, may refer an electrode of a metal oxide semiconductor field effect transistors (MOSFET). A gate may be located between the source and drain of a MOSFET to control the flow of electrical current between the source and drain. In one embodiment, gates are routed at a fixed pitch and are comprised of a polycrystalline silicon ("poly") or metal based material. A gate may also refer to dummy gates. Dummy gates are similar to regulator gates, but are non-functional and are not used to form a MOSFET. They are typically used to maintain the regularity of a gate pattern required by restrictive design rules.

Computing Machine Architecture

FIG. (FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), a main memory 104, a static memory 106, and a storage unit 116 which are configured to communicate with each other via a bus 108. The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Standard Cell Layout

In the following description, numerous specific details are set forth, such as examples of specific data signals, components, transistors, etc. Specifically, a two input NAND gate and an inverter will be used as examples of a standard cell for illustrating the layout of a compact standard cell. However, this example is given only for the purposes of illustration, and many other standard cells for other logic gates can be formed using the disclosed techniques. Thus, the specific details and implementations set forth are merely exemplary.

Figure 2A:
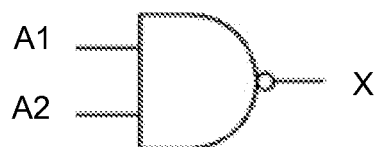
FIG. 2A illustrates one embodiment of a logic symbol of a NAND gate.

FIG. 2A illustrates a logic symbol of a two input NAND gate. The NAND gate includes two inputs, A1 and A2. The NAND gate generates an output X based on the logic level of its inputs, A1 and A2, according to a pre-defined truth table.

Figure 2B:
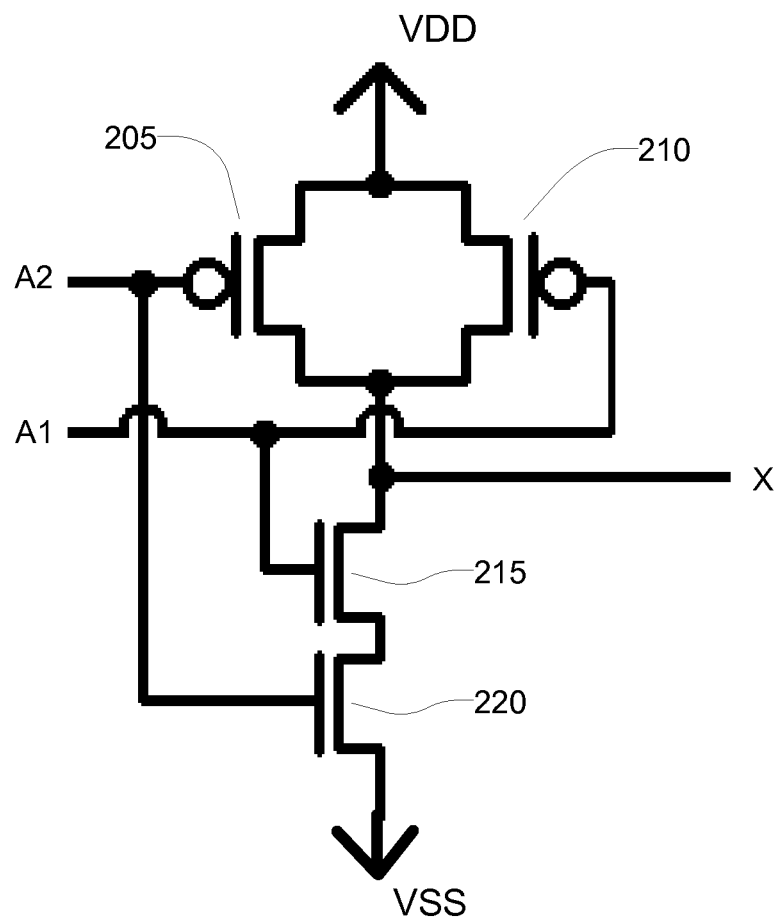
FIG. 2B illustrates one embodiment of a schematic of four transistors used to create the NAND gate of FIG. 2A.

FIG. 2B illustrates one embodiment of a schematic of four transistors used to create the NAND gate of FIG. 2A. The NAND gate includes two p-channel metal oxide semiconductor field-effect transistors (PMOS) and two n-channel metal-oxide-semiconductor field-effect transistors (NMOS). Both PMOS transistors 205 and 210 are coupled to a positive supply voltage VDD. NMOS transistor 220 is coupled to negative supply voltage VSS. In one embodiment, the VSS supply voltage is equivalent to ground. Input A2 is coupled to the gate of transistor 205 and transistor 220 and controls the on/off status of these transistors. Input A1 is coupled to the gate of transistor 210 and transistor 215 and controls the on/off status of these transistors. The transistors generate an output X based on the logic levels of the two inputs A1 and A2.

Figure 3:
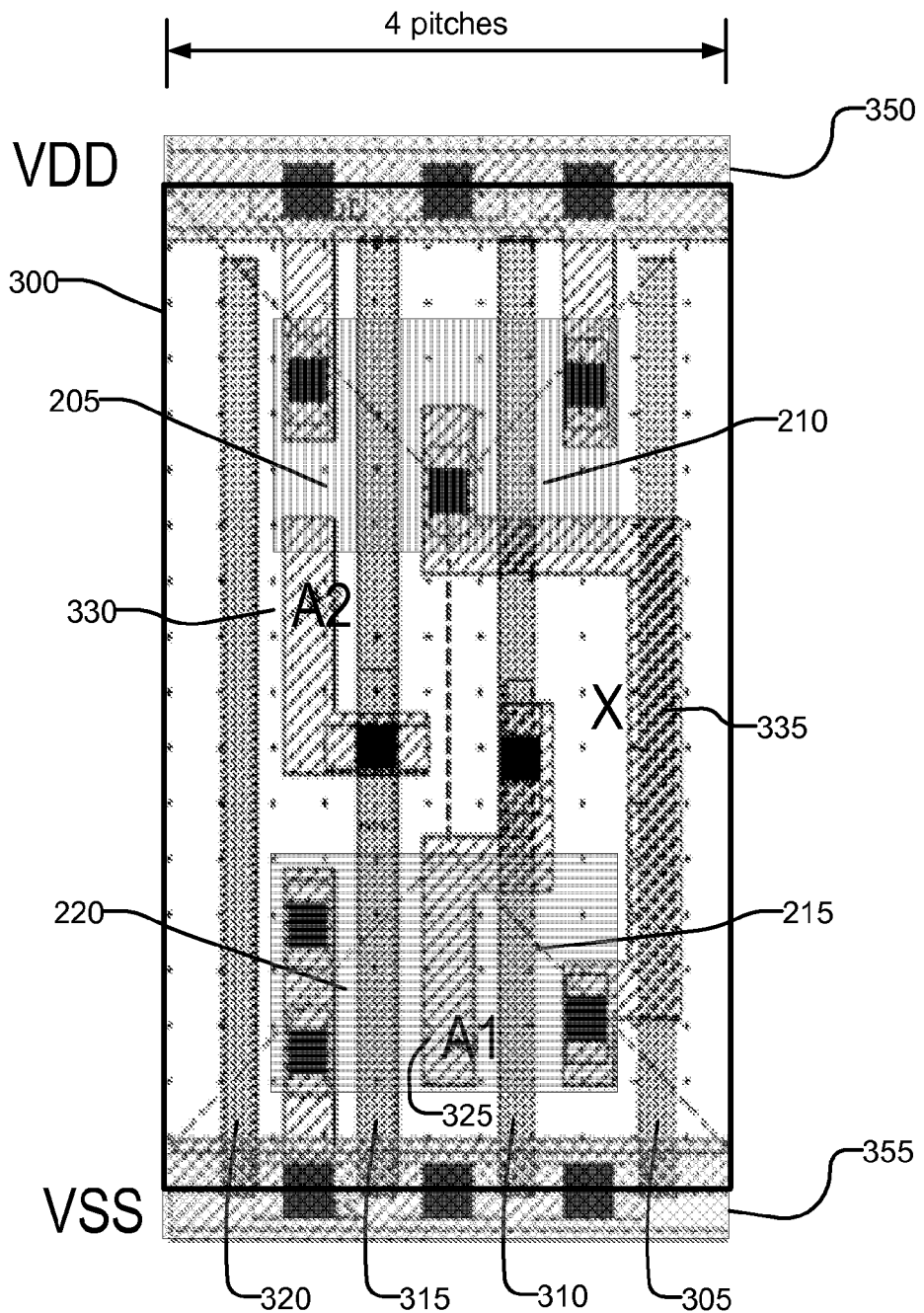
FIG. 3 illustrates a conventional standard cell implementing the NAND gate of FIGS. 2A and 2B.

FIG. 3 illustrates a conventional standard cell 300 implementing the two input NAND gate of FIGS. 2A and 2B. The cell 300 can be conceptually divided into sections that correspond to the four individual transistors 205, 210, 220, and 215 needed to implement a NAND gate. The cell 300 includes four gates 305, 310, 315, and 320 that are spaced at a fixed pitch. Gate 315 corresponds to the gate of transistors 205 and 220. Gate 310 corresponds to the gate of transistors 210 and 215. Gates 305 and 320 are dummy gates that are not used to form any transistors.

The cell 300 further includes a plurality of cell pins. For example, wire 325 is an input pin for accessing input signal A1 and wire 330 is an input pin for accessing input signal A2. Wire 335 is an output pin for accessing output signal X. The signal pins (e.g., wire 325) are placed on a lower level metal 1 ("M1") layer. Other internal connections within the cell, such as connections between the VSS/VDD and the transistors, are also routed on the M1 layer. In other embodiments, the signals pins and internal connections may be placed on a layer other than the M1 layer. Integrated circuits use several metal layers for routing wires. The metal layer closest to the substrate is referred to as the metal 1 ("M1") layer. The next closest layer is referred to as the metal 2 ("M2") layer, and the next closest layer after the M2 layer is referred to as the metal 3 ("M3") layer. In one embodiment, metal layers are routed according to an alternating horizontal-vertical-horizontal (HVH) or vertical-horizontal-vertical (VHV) topology. In other words, all wires in a metal layer run predominantly in one direction, and the wires in the adjacent metal layer run predominantly in an orthogonal direction. For example, if the wires in the M1 layer run vertically, the wires in the M2 layer run horizontally, and the wires in the M3 layer run vertically. Additionally, wires in different metal layers are connected to each other using vias.

Wires 350 and 355 are the power pins for connecting the cell to VDD and VSS power supply voltages. Wire 350 is configured to carry a VDD voltage and wire 355 is configured to carry a VSS voltage. Both power pins are routed in the M2 layer in a direction that is orthogonal to the gates (e.g., gate 310). Both power pins are also routed along the boundaries of the cell 300. Placing the power pins at the cell boundaries enables a single horizontal power route/rail to be shared by vertically flipped cells in adjacent cell rows. By reducing the width of power rails, congestion in routing global interconnects between the various cells of a circuit design can be reduced. However, in the presence of certain restrictive design rules such as fixed gate pitch, uni-directional gates, etc., this type of cell layout is not ideal because it results in a large cell 300. For example, the width of the two input NAND gate of FIG. 3 is approximately four gate pitches in order to accommodate all the metal connections between transistors within the cell and signal pins for accessing the cell signals. Further, due to the placement of the power pins 350 and 355, all the signal pins (e.g., wire 325) in the standard cell 300 are located between the two power pins 350 and 355.

Figure 4:
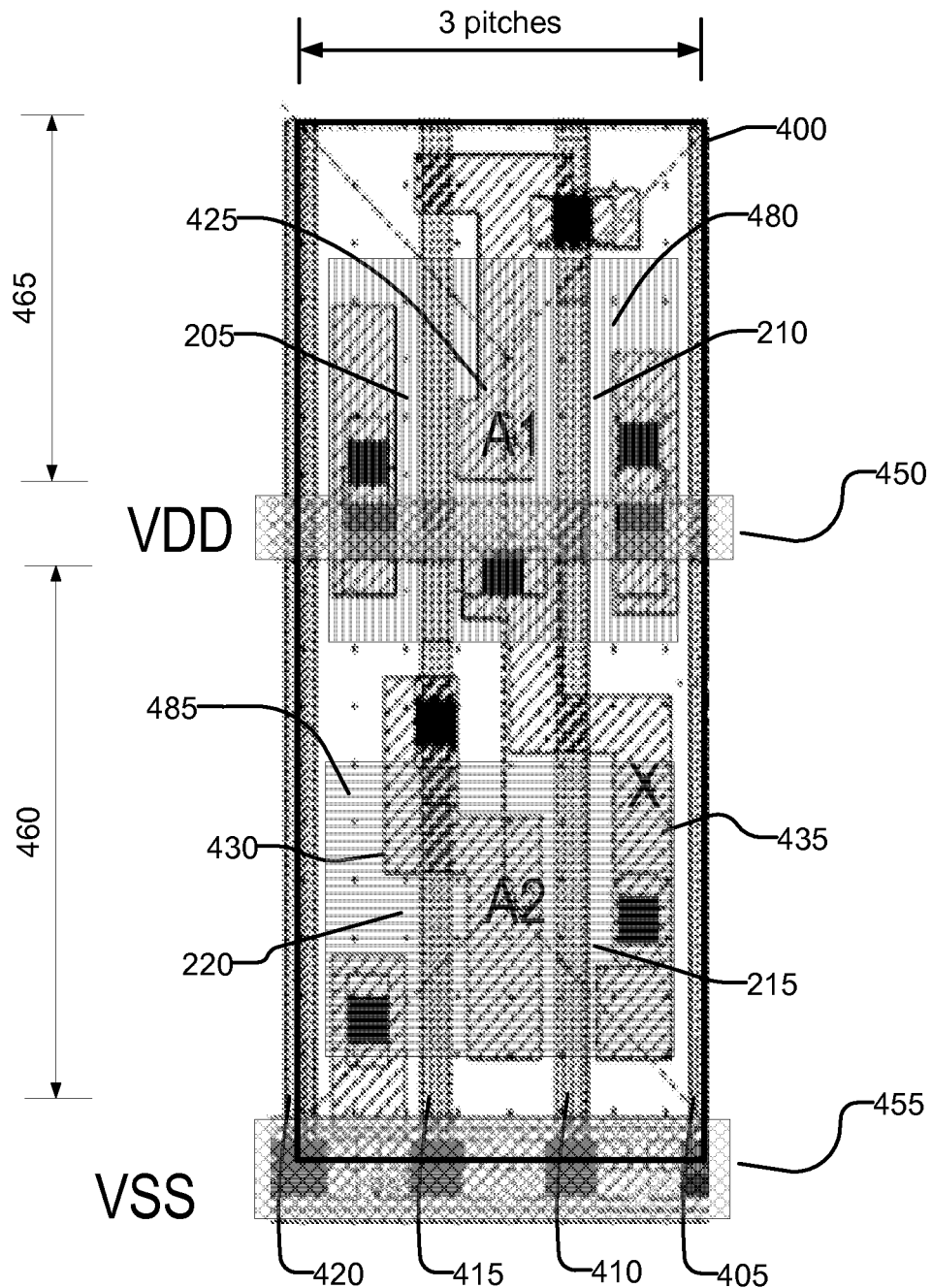
FIG. 4 illustrates one embodiment of a compact standard cell implementing the NAND gate of FIGS. 2A and 2B.

FIG. 4 illustrates one embodiment of a compact standard cell 400 implementing the two input NAND gate of FIGS. 2A and 2B. As shown, the cell layout in FIG. 4 routes one power pin at the boundary of the cell 400, while routing another power pin inside the cell 400, resulting in a cell that is more compact than the conventional cell layout in FIG. 3. This is accomplished while still complying with restrictive design rules and keeping overall routing congestion to a minimum.

The cell 400 can be conceptually divided into sections corresponding to the four individual transistors 205, 210, 220, and 215 needed to implement a NAND gate. Transistors 205 and 210 are formed in diffusion area 480. Transistors 215 and 220 are formed in a different diffusion area 485. The cell also includes four gates 405, 410, 415, and 420 that are spaced at a fixed pitch. Gate 415 corresponds to the gate of transistors 205 and 220. Gate 410 corresponds to the gate of transistors 210 and 215. Gates 405 and 420 are dummy gates that are not used to form any transistors.

The cell 400 includes a plurality of signal pins. For example, wire 425 is an input pin for accessing input signal A1 and wire 430 is an input pin for accessing input signal A2. Wire 435 is an output pin for accessing output signal X. As shown, the signal pins (e.g., wire 425) are placed in the M1 layer. Other internal connections within the cell, such as connections between the VSSNDD and the transistors, are also routed on the M1 layer.

The cell includes a first power pin 450 for carrying a VDD voltage that is routed along the interior of the cell. The cell also includes a second power pin 455 for carrying a VSS voltage that is routed at the boundary of the cell. Both power pins are substantially parallel to each other and routed as wires in the M2 layer in a direction that is orthogonal to the gates (e.g., gate 410). Although the VDD pin 450 is shown as being inside the cell and VSS pin 455 is shown as being at the boundary of the cell, in other embodiments VSS is routed inside the cell and VDD is routed at the boundary of the cell. In other embodiments, one or both of the power pins may be routed on a metal layer other than the M2 layer. For example, the VDD power pin 450 may be in the M2 layer while the VSS power pin 455 is in the M1 layer.

The placement of the power pins 450 and 455 divides the cell into two regions 460 and 465. One region 460 is bounded by and is located between the two power pins. The other region 465 is not bounded by the two power pins, but is bounded by one power pin 450 and the top cell boundary. The placement of the power pins 450 and 455 allows some of the signal pins 330 and 335 and diffusion areas 435 to be placed in a region 460 of the cell that is between the two power pins. The placement of the power pins 450 and 455 also allows other signal pins 425 and diffusion areas 480 to be partially or totally located in a region 465 that is not between the two power pins. In some embodiments, internal metal routing connections between the transistors of a cell are also partially or totally located in region 465 (not shown).

Routing one power pin at the boundary of a cell while routing another power pin along the interior of the cell is beneficial for a number of reasons. One of many advantages is that the routing technique creates compact and efficient cells. By placing one of the power pins inside the cell, the routing within the cell is greatly simplified, for example, by reducing the length of metal traces within the cell and simplifying the source and drain connections to VDD and VSS. As a result, the NAND gate cell in FIG. 4 has a width of only three gate pitches, whereas the conventional NAND gate cell of FIG. 3 has a width of four gate pitches. Although the standard cells in both FIG. 3 and FIG. 4 include four poly lines, the standard cell in FIG. 3 is actually wider because it includes the regions that extend past the outside poly lines. Thus, the cell size for a NAND gate is reduced by 25%. Other standard cells implementing other logic devices can also benefit from this type of cell layout. For example, inverters are 33% smaller and flip-flops are 5-10% smaller. As a result, an integrated circuit created with these standard cells is estimated to be approximately 5-15% smaller.

The illustrated cell layout also maintains compliance with design rules which enable efficient chip routing, but are not absolute rules needed by the foundry to manufacture a chip. For example, in standard cell designs, it is preferable to route traces in the M2 layer orthogonal to the gates to maintain consistency with memory cells, which route traces such as bit lines in the M2 layer orthogonal to the gates. The cell layout in FIG. 4 complies with this design rule by routing the power pins in the M2 layer orthogonal to the gates. Further, in the cell layout of FIG. 4, all the internal routing for the cell is located in the M1 layer. None of the internal cell routing is located in the M2 layer. By minimizing the use of the M2 layer for internal routing, global routing congestion is also minimized. For example, to access the cell pin 425 for the A1 input signal, a single trace on the M2 layer can be routed across the cell 400 in a direction that is orthogonal to the gates and connected to the pin 425 with a single via.

Figure 5:
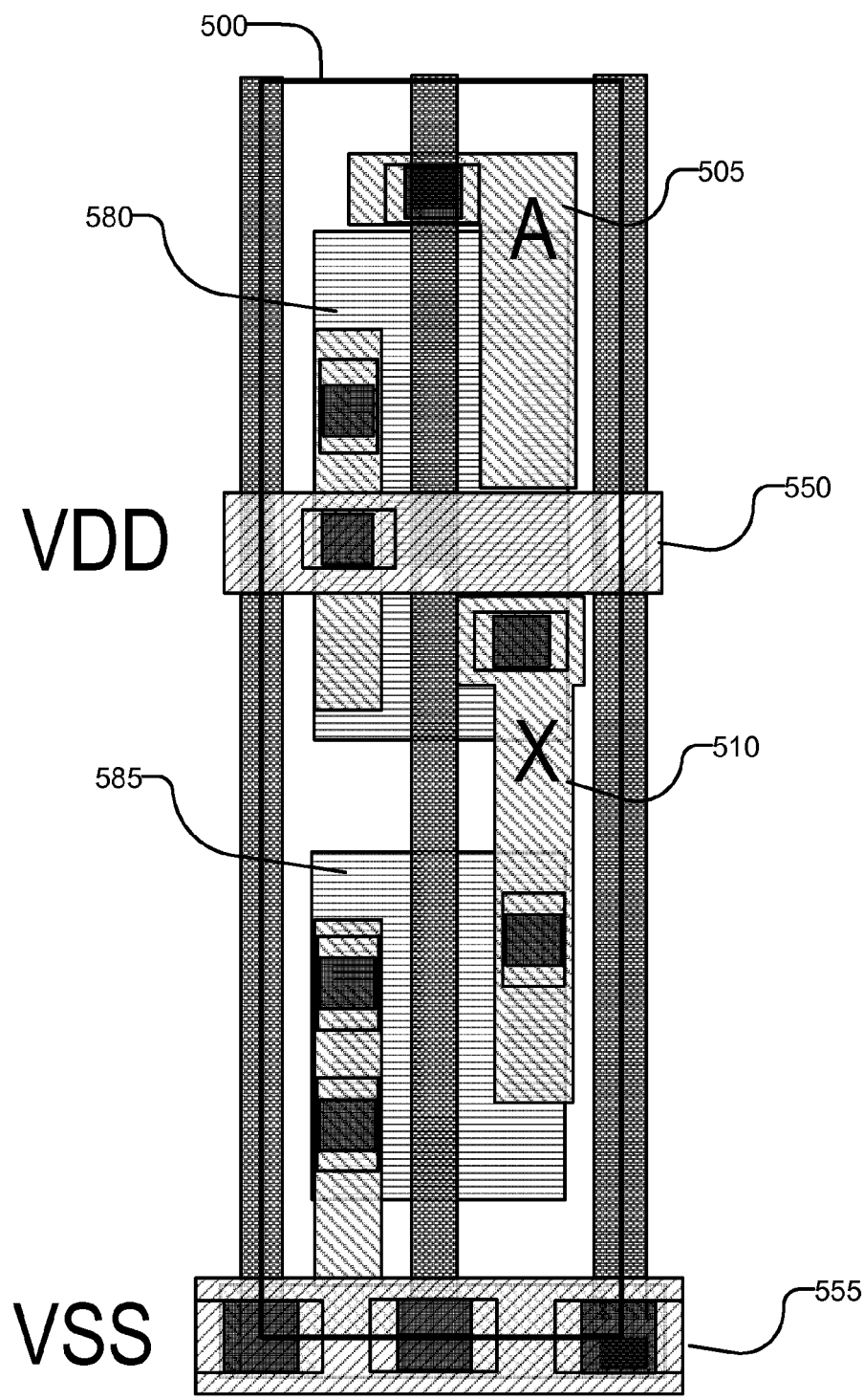
FIG. 5 illustrates one embodiment of a compact standard cell implementing an inverter.

FIG. 5 illustrates one embodiment of a compact standard cell 500 for an inverter. As shown, the inverter is a standard CMOS inverter that comprises one PMOS transistor, one NMOS transistor, and has one input signal A and one output signal X. The standard cell includes two power pins 550 and 555. The VDD pin 550 is routed inside the cell 500 and the VSS pin 555 is routed at the boundary of the cell 500. Both power pins 550 and 555 are routed on the M2 layer orthogonal to the gates. Due to the placement of the power pins 550 and 555, the input pin 505 for signal A is placed above VDD and the output pin 510 for signal X is routed in the region between VDD and VSS. Additionally, diffusion area 585 is located between VDD and VSS, whereas a portion of diffusion region 580 is located above VDD. This cell layout results in a compact inverter that is only two pitches wide. By contrast, a conventional standard cell of the same height with power pins routed along the boundary of the cell has a cell layout that is three pitches wide.

Figure 6A:
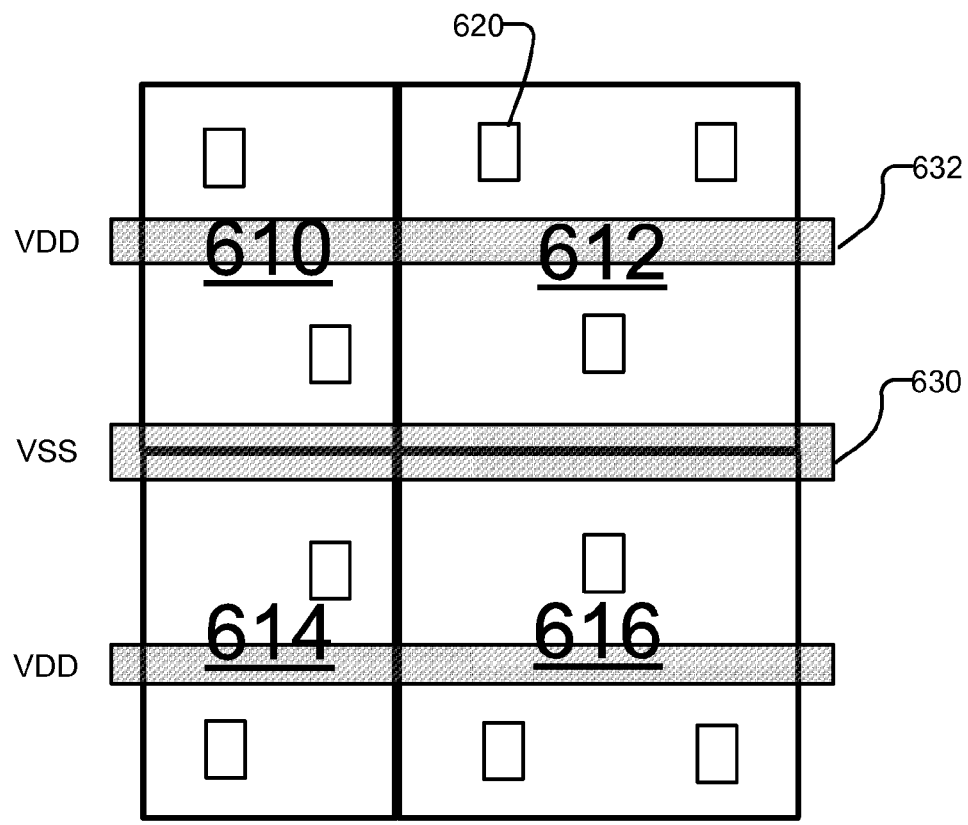
FIG. 6A illustrates one embodiment of a layout that includes several standard cell instances.

FIG. 6A illustrates one embodiment of an integrated circuit layout that includes several standard cell instances. As shown, there are several standard cell instances 610, 612, 614, and 616 that have VSS pins routed at the boundary of the cell and VDD pins routed along the interior of the cell. The standard cells have signal pins, such as signal pin 620, for inter-connecting the various cells to implement the desired functionality of a circuit design. Cell 614 represents a vertically flipped version of cell 610 and cell 616 represents a vertically flipped version of cell 612.

In one embodiment, standard cells within a cell library are generally configured to have similar characteristics. Standard cells within a single library may have a fixed height, which allows the cells to be placed in rows. For example, cells 610 and 612 have the same height. Cells 610 and 612 form one row, while cells 614 and 616 form a second row.

In one embodiment, standard cells within a library may be designed to have power pins of fixed width placed at fixed heights. By fixing the width and heights of the power pins, the pins of the cells form a common power rail that is shared amongst the cells when placed into a layout. For example, cell 610 and cell 612 share common VDD 630 and VSS 632 power rails. As used herein, a power rail is defined as a wire structure that is primarily used to carry a power supply voltage, such as VDD, VSS, ground, etc. to the cells of an integrated circuit. The VDD power rail 632 is routed along the interior of the cells 610 and 612, while the VSS power rail 630 is routed along the boundary of the cells 610 and 612. In one embodiment, the VDD 632 and VSS 630 power rails are routed on an M2 layer. In other embodiments, the VDD 632 or VSS 630 power rails may be routed on a metal layer other than the M2 layer.

Additionally, as the cell library may only support a fixed maximum P width and a fixed maximum N width for all standard cells, the n-well boundary within all standard cell rows is fixed. Fixed maximum P widths and N widths enable a continuous n-well across the entire standard cell row, simplify cell layout and reduce variability in performance of transistors from uneven n-well boundaries in the vicinity of the transistors. The ratio of the maximum P width to the maximum N width for a cell library is called the library P:N ratio. The library P:N ratio affects the relative drive of single PMOS and NMOS transistors in the library, and can be adjusted to account for particular process technologies depending on whether their P transistor has stronger drive per unit size or the N transistor has stronger drive per unit size.

In one embodiment, the optimal placement for the power pins of standard cells in a cell library depends on the P:N ratio of the cell library. If the P:N ratio is greater than one, this indicates that the PMOS transistors in each cell are generally (but not always) larger than the NMOS transistors. As a result, VDD should be routed across the interior of the cells to simplify the connections to the PMOS transistors while VSS is routed on the boundary of the cells. On the other hand, if the P:N ratio is less than one, VDD should be routed on the boundary of the cells while VSS is routed across the interior of the cells to simplify the connections to the NMOS transistors.

Figure 6B:
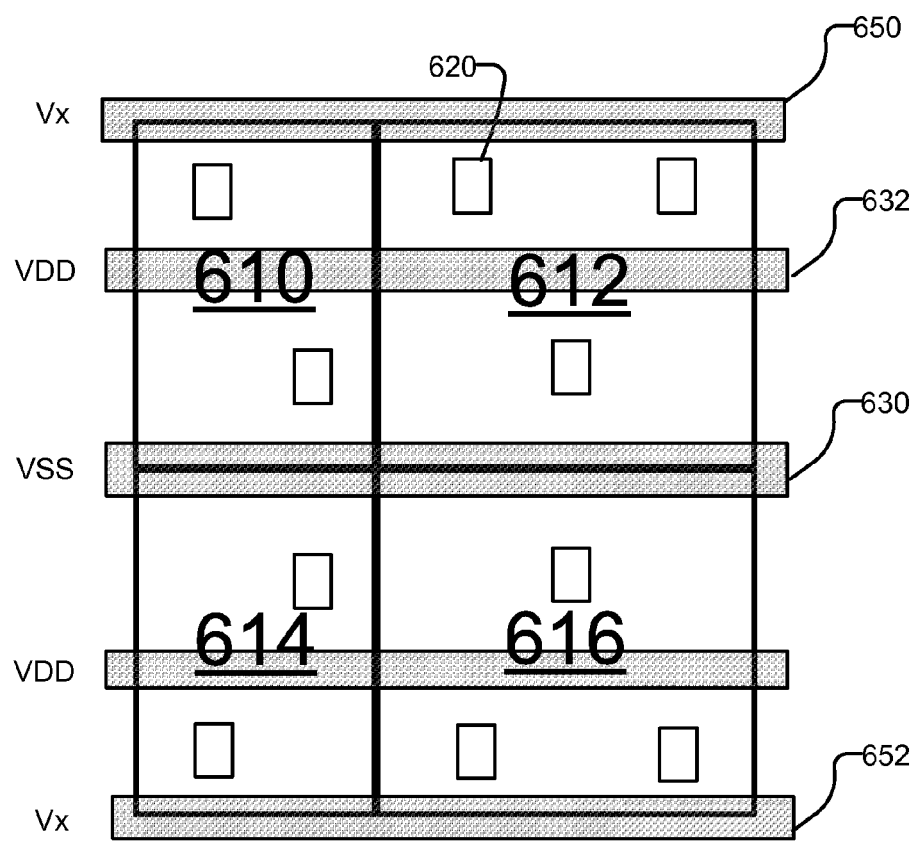
FIG. 6B illustrates another embodiment of a layout that includes several standard cell instances.

FIG. 6B illustrates another embodiment of an integrated circuit layout that includes several standard cell instances. FIG. 6B is similar to FIG. 6A, except that each row of cells also includes additional power rails 650 and 652 routed along the top and bottom boundaries of the cell rows for carrying a Vx voltage potential. The Vx power rails 650 and 652 may be shared with cells in adjacent and abutting rows (not shown), similar to how the VSS power rail 630 is shared between two rows of cells.

In one embodiment, Vx is a voltage that may be turned on or off separately from the primary source supplies (VDD/VSS) and/or has a different level of voltage potential compared to the primary source supplies. For example, Vx may represent one of the following: (1) a retention voltage (VDDR/VSSR) that stays on when the primary source supplies, VDD/VSS, are turned off during a standby mode (2) a switchable on/off source of power to components in the cells when the integrated circuit is in operation (3) a voltage for biasing the well substrate of a transistor higher than the source voltage potential of that transistor to reduce power loss due to leakage (4) a voltage for connecting to some of the cells in a row of cells to allow the cells to operate with different voltage potential requirements than neighboring cells, or (5) a voltage that provides other similar functions. In one embodiment, the power rails (e.g., 650, 632, and 630) all have the same width. For example, the power rails may all have a width that is equal to a minimum width for metal wires set by process design rules. In one embodiment, sharing the Vx power rail 650 between adjacent cell rows is beneficial because the Vx power rail 650 occupies less space. The Vx power rail 650 does not carry a high amount of current, and hence, it is efficient to reduce the width of the Vx power rail 650.

Creating an Integrated Circuit from Standard Cells

Figure 7:
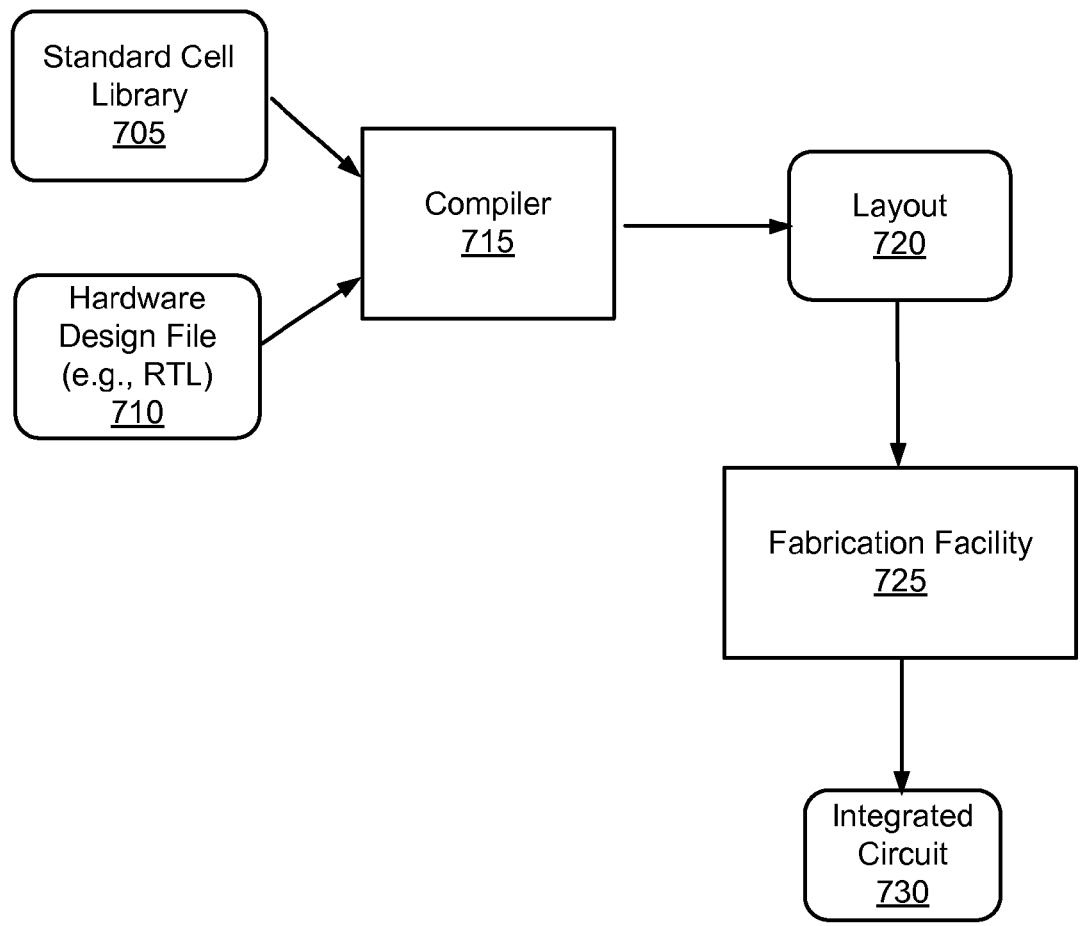
FIG. 7 illustrates one embodiment of a high level overview of the process of generating an integrated circuit from a standard cell library.

FIG. 7 illustrates one embodiment of a high level overview of the process of generating an integrated circuit from a standard cell library. Initially, a compiler 715 receives a hardware description file 710 for an integrated circuit (IC) design and a standard cell library 705. The compiler 715 represents various software tools that are part of an Electronic Design Automation (EDA) toolset, such as synthesis tools and place and route tools. The compiler 715 includes instructions that are stored in a machine-readable medium, similar to that described in conjunction with FIG. 1. The instructions can be executed by a processor, which causes the processor to perform the functionality described herein.

In one embodiment, the hardware description file 710 is a register transfer level description that describes the desired functionality of a circuit. For example, the hardware description file 710 may be in a hardware description language such as Verilog or VHDL. The hardware description file 710 may describe an entire integrated circuit or a portion of a larger integrated circuit. In one embodiment, the hardware description file 710 is stored in a machine-readable medium, which is then loaded by the compiler for processing.

The standard cell library 705 includes a plurality of standard cells for use in creating the layout of an integrated circuit. In one embodiment, the standard cells are configured to have one power rail routed inside the standard cells, and another power rail routed at the boundary of the standard cells, similar to the standard cells in FIGS. 4 and 5. Additionally, the standard cell library 705 may include other information describing characteristics of the standard cells, such as simulation models and power models. In one embodiment, the standard cell library 705 is stored in a machine-readable medium, which is then loaded by the compiler 715 for processing.

Using the hardware description file 710 and the standard cell library 705, the compiler generates a physical layout 720 for the integrated circuit. In one embodiment, the compiler 715 converts the hardware description file 710 into a netlist. The netlist is the standard-cell representation of the integrated circuit design at the logical view level. It consists of instances of the standard cell library gates and port connectivity between the gates. The compiler 715 then creates the physical implementation of the integrated circuit by assigning locations for each gate in the netlist and drawing the interconnections between the cell pins of the gates. The resulting data is converted into a standardized format, such as Graphic Database System II (DSS II) that represents the layout of the integrated circuit with geometric shapes, text labels, and other information.

The fabrication facility 725 receives the layout 720 from the compiler and forms the shapes (e.g., metal wires, gates, vias, etc.) defined by the layout. In one embodiment, the facility 625 generates a lithographic mask and uses the lithographic mask to fabricate the IC. Fabrication facilities 725 may use a standard CMOS logic process having minimum line widths such 90 nm, 65 nm, 45 nm, 32 nm, 22 nm, etc. The size of the CMOS logic process employed typically defines the smallest lithographic dimension that can be fabricated on the chip using the lithographic masks, which in turn determines minimum component size. In an embodiment, light is transmitted through these lithographic masks onto a silicon wafer to transfer the layout for the integrated circuit onto the wafer.

The end result of the process is a cell-based integrated circuit 730 built from standard cells that performs the functionality desired by the circuit designer. Because the integrated circuit is designed and manufactured from compact standard cells having one power pin routed along the inside the standard cell and another power pin routed along the boundary of the cell, the resulting integrated circuit is more compact than an integrated circuit made from conventional standard cells. In some cases, the integrated circuit may be up to 15% smaller than an integrated circuit made from conventional standard cells.

Figure 8:
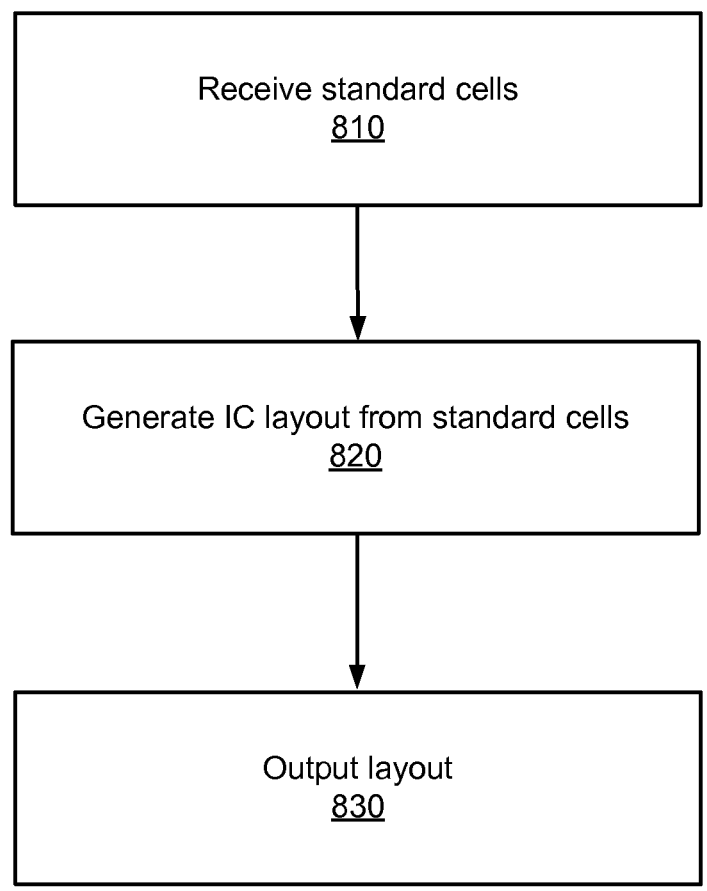
FIG. 8 illustrates one embodiment of a method for generating a layout for an integrated circuit.

FIG. 8 illustrates one embodiment of a method for generating a layout (i.e. representation of) for an integrated circuit. In one embodiment, the method is performed by the compiler 715. In one embodiment of the method, the compiler 715 receives 810 one or more standard cells. For example, the cells may be stored in a computer readable medium of computer 100 as part of a standard cell library and loaded into memory by the compiler 715, or the cells may be retrieved by the compiler 715 from another computer 100 over a network. One or more of the cells are configured in a manner similar to that shown in FIG. 4, 5, 6A or 6B. For example, a cell may include a metal wire at one boundary of the cell for carrying a VSS voltage and a second metal wire located along an interior of the cell for carrying a VDD voltage. One or more cell pins are located between VDD and an opposite boundary of the cell. In some embodiments, a third metal wire carrying a Vx voltage potential is also located at the opposite boundary of the cell.

The compiler 715 generates 820 a layout (i.e. representation of) for a block of an integrated circuit by arranging instances of the standard cells into rows of cells. In one embodiment, the resulting layout resembles the layout shown in FIG. 6A or 6B. For example, the cells are arranged so that some adjacent and abutting rows of cells share a common power rail, and each row of cells has a power rail routed across the interior of the row. The layout of the cell block is then output 630, which can include storing the layout to a non-transitory computer readable medium.

Figure 9:
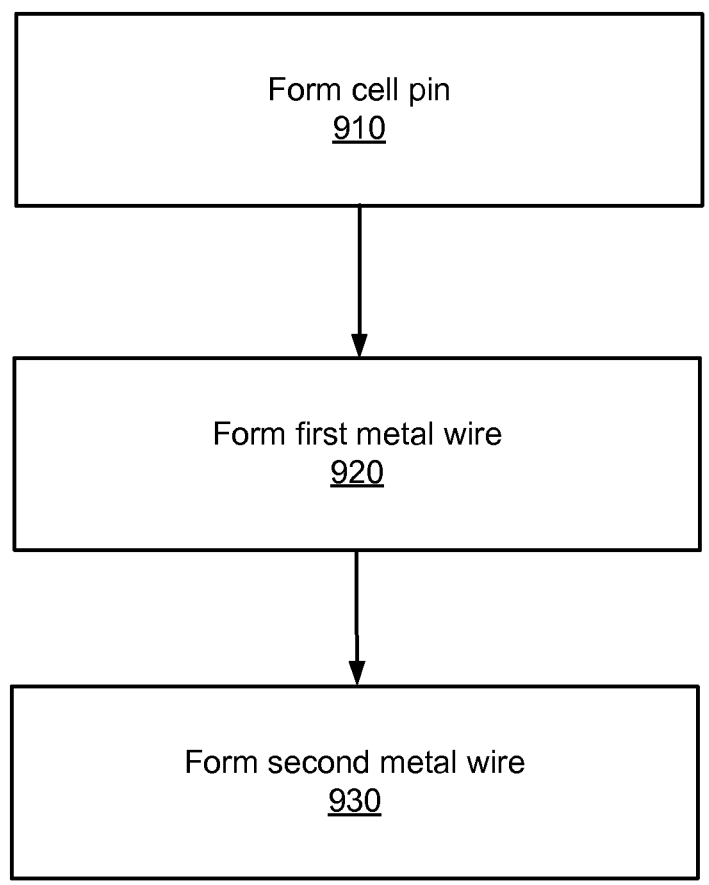
FIG. 9 illustrates one embodiment of a method for fabricating an integrated circuit.

FIG. 9 illustrates one embodiment of a method for fabricating an integrated circuit. For example, the integrated circuit may be fabricated by following a layout generated by a compiler 715. In one embodiment of the method, a cell pin for carrying an input or output signal of a cell of the integrated circuit is formed 910 in a metal layer. A metal wire for carrying a power supply voltage (e.g., VDD) is formed 920 along a first boundary of a cell of the integrated circuit. A second metal wire for carrying a second power supply voltage (e.g., VSS) is formed 930 along an interior of the cell. The metal wires are formed such that the cell pin is located between the second metal wire and a boundary of the cell that is opposite the first boundary. In one embodiment, the fabricated integrated circuit appears similar to the illustrations in FIGS. 6A and 6B.

The disclosed embodiments are thus beneficial for creating more compact integrated circuits. By routing a power rail along an interior of the cell and another power rail along a boundary of the cell, the source and drain connections within a cell can be greater simplified. By allowing cell pins to be distributed both above and below the internal power rail, the internal routing within the cell is also simplified. As a result, the size of a standard cell and the integrated circuit created from the standard cell are both significantly reduced.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The various operations of example methods described herein, such as those performed by the compiler, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to improve the clarity of this disclosure. This description should be read to include one or at least one and the singular also includes the plural unless it is obvious that it is meant otherwise.

Upon reading this disclosure, those of skill in the art will appreciate still additional alternative structural and functional designs for a system for creating an integrated circuit from a standard cell library of compact standard cells through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable medium storing a cell library, the cell library including at least one cell that comprises:
   a first power pin extending along a first boundary of the cell for carrying a first power supply voltage;
   a second power pin extending along an interior of the cell for carrying a second power supply voltage; and
   a first cell pin for carrying one of an input signal or output signal of the cell and located between the second power pin and a second boundary of the cell that is opposite from the first boundary.

2. The computer readable medium of claim 1, wherein the cell further comprises one or more gates oriented in a direction orthogonal to a direction in which the first and second power pins extend.

3. The computer readable medium of claim 1, wherein the first cell pin corresponds to a first metal layer closest to the substrate and the second power pin corresponds to a second metal layer above the first metal layer.

4. The computer readable medium of claim 3, wherein the first power pin corresponds to the second metal layer.

5. The computer readable medium of claim 1, wherein the cell further comprises a second cell pin corresponding to one of an input or an output signal of the cell and placed between the first and second power pins.

6. The computer readable medium of claim 1, wherein the cell library has a P:N ratio indicating that a maximum PMOS transistor width for the cell library is greater than a maximum NMOS transistor width for the cell library, and wherein the second power supply voltage has a higher voltage potential than the first power supply voltage.

7. The computer readable medium of claim 1, wherein the cell library has a P:N ratio indicating that a maximum NMOS transistor width for the cell library is greater than a maximum PMOS transistor width for the cell library, and wherein the first power supply voltage has a higher voltage potential than the second power supply voltage.

8. The computer readable medium of claim 1, wherein the cell further comprises a third power pin extending along the second boundary of the cell for carrying a third power supply voltage.

9. The computer readable medium of claim 1, wherein the cell further comprises internal metal routing connecting a first transistor of the cell to a second transistor of the cell, wherein at least a portion of the internal metal routing is located between the second power pin and the second boundary of the cell.

10. The computer readable medium of claim 1, wherein the first power pin corresponds to a first power rail and the second power pin corresponds to a second power rail.

11. A computer implemented method for cell based layout generation, the method comprising:
    receiving a plurality of cells, at least one of the cells comprising:
        a first power pin extending along a first boundary of the cell for carrying a first power supply voltage;
        a second power pin extending along an interior of the cell for carrying a second power supply voltage; and
        a first cell pin for carrying one of an input signal or output signal of the cell and located between the second metal wire and a second boundary of the cell that is opposite from the first boundary; and
    generating a layout for an integrated circuit based on the plurality of cells.

12. The method of claim 11, wherein the cell further comprises one or more gates that are orthogonal to the first and second power pins.

13. The method of claim 11, wherein the first cell pin corresponds to a first metal layer and the second power pin corresponds to a second metal layer above the first metal layer.

14. The method of claim 13, wherein the first power pin corresponds to the second metal layer.

15. The method of claim 11, wherein at least one of the cells further comprises a second cell pin corresponding to one of an input or output signal of the cell and located between the first and second power pins.

16. A non-transitory computer readable medium configured to store instructions for cell based layout generation, the instructions when executed by a processor cause the processor to perform steps comprising:
    receiving a plurality of cells, at least one of the cells comprising:
        a first power pin extending along a first boundary of the cell for carrying a first power supply voltage;
        a second power pin extending along an interior of the cell for carrying a second power supply voltage; and
        a first cell pin for carrying one of an input signal or output signal of the cell and located between the second metal wire and a second boundary of the cell that is opposite from the first boundary; and
    generating a layout for an integrated circuit based on the plurality of cells.

17. The computer readable medium of claim 16, wherein the cell further comprises one or more gates that are orthogonal to the first and second power pins.

18. The computer readable medium of claim 16, wherein the first cell pin corresponds to a first metal layer and the second power pin corresponds to a second metal layer above the first metal layer.

19. The computer readable medium of claim 18, wherein the first power pin corresponds to the second metal layer.

20. The computer readable medium of claim 16, wherein at least one of the cells further comprises a second cell pin corresponding to one of an input or output signal of the cell and located between the first and second power pins.

* * * * *